United States Patent
Manadhata et al.

(10) Patent No.: US 9,124,621 B2
(45) Date of Patent: Sep. 1, 2015

(54) SECURITY ALERT PRIORITIZATION

(71) Applicant: Hewlett-Packard Development Company, L.P., Houston, TX (US)

(72) Inventors: Pratyusa Kumar Manadhata, Piscataway, NJ (US); Prasad V. Rao, Metuchen, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 124 days.

(21) Appl. No.: 13/629,222

(22) Filed: Sep. 27, 2012

(65) Prior Publication Data

US 2014/0090056 A1    Mar. 27, 2014

(51) Int. Cl.
*H04L 29/06* (2006.01)
*G06F 21/55* (2013.01)

(52) U.S. Cl.
CPC .......... *H04L 63/1416* (2013.01); *G06F 21/552* (2013.01); *H04L 63/14* (2013.01); *H04L 63/1433* (2013.01); *G06F 2221/2101* (2013.01); *G06F 2221/2105* (2013.01); *G06F 2221/2149* (2013.01)

(58) Field of Classification Search
CPC . H04L 63/14; H04L 63/1408; H04L 63/1416; H04L 63/1425; H04L 63/1433
USPC ............................... 726/22, 23, 25
See application file for complete search history.

(56) References Cited

U.S. PATENT DOCUMENTS

| | | | |
|---|---|---|---|
| 6,704,874 B1 * | 3/2004 | Porras et al. ............ | 726/22 |
| 7,379,993 B2 | 5/2008 | Valdes et al. | |
| 7,594,266 B2 | 9/2009 | Mattsson et al. | |
| 8,341,745 B1 * | 12/2012 | Chau et al. ............. | 726/24 |
| 2009/0307772 A1 | 12/2009 | Markham et al. | |
| 2013/0179974 A1 | 7/2013 | Manadhata et al. | |

FOREIGN PATENT DOCUMENTS

WO    WO 2005114354 A1 *  12/2005

OTHER PUBLICATIONS

Porras, P.A. et al., A Mission-impact-based Approach to Infosec Alarm Correlation, Proceedings of the 5th international conference on Recent advances in intrusion detection, 2002, pp. 95-114.

Zomlot, L. et al., Prioritizing Intrusion Analysis Using Dempster-shafer Theory, Proceedings of the workshop on Security and artificial intelligence, Oct. 21, 2011, pp. 59-70.

Alexa: Top Sites, accessed at http://www.alexa.com/topsites, accessed on Dec. 17, 2014, 112 pages.

Anderson, S. D. et al., "Spamscatter: characterizing internet scam hosting infrastructure", Proceedings of 16th USENIX Security Symposium on USENIX Security Symposium Article No. 10, 2007, 14 pages.

(Continued)

*Primary Examiner* — Edward Zee

(74) *Attorney, Agent, or Firm* — Hewlett-Packard Patent Department

(57) ABSTRACT

In one implementation, a security alert prioritization system identifies a host and a domain associated with a security alert that was generated in response to a communication between the host and the domain. The security alert prioritization system accesses a security state associated with the host and a security state associated with the domain, and compute a priority of the security alert based on the security state associated with the host and the security state associated with the domain.

20 Claims, 6 Drawing Sheets

(56) References Cited

OTHER PUBLICATIONS

Antonakakis, M. et al., "Building a Dynamic Reputation System for DNS", Proceedings of the 19th USENIX conference on Security, 2010, 17 pages.
Bilge, L. et al., "Exposure: Finding Malicious Domains Using Passive DNS Analysis", Network and Distributed System Security Symposium, 2011, 7 pages.
Brin, S. and Page, L., "The Anatomy of a Large-Scale Hypertextual Web Search Engine", Computer Networks and ISDN Systems, vol. 30, Apr. 1998, pp. 107-117.
Chau, H. D. et al., "Polonium: Tera-Scale Graph Mining and Inference for Malware Detection", Conference on Knowledge Discovery and Data Mining, Jul. 25, 2010, 8 pages.
Collins, M. P. and Reiter, M. K., "Hit-List Worm Detection and Bot Identification in Large Networks Using Protocol Graphs", Proceedings of the 10th international conference on Recent advances in intrusion detection, 2007, pp. 276-295.
Freeman, W. T. et al., "Learning Low-Level Vision", International Journal of Computer Vision. vol. 40, Issue 1, 2000. pp. 25-47.
Freiling, F. C. et al., "Botnet Tracking: Exploring a Root-Cause Methodology to Prevent Distributed Denial-of-Service Attacks", Proceedings of the 10th European conference on Research in Computer Security, 2005, pp. 319-335.
Frey, B. J. et al., "A Revolution: Belief Propagation in Graphs With Cycles," In Advances in Neural Information Processing Systems, Dec. 1997, 7 pages.
Gu, G. et al., "BotHunter: Detecting Malware Infection Through IDS-Driven Dialog Correlation", Proceedings of 16th USENIX Security Symposium on USENIX Security Symposium, Article No. 12, 2007, 16 pages.
Gu, G. et al., "BotSniffer: Detecting Botnet Command and Control Channels in Network Traffic", Proceedings of the 15th Annual Network and Distributed System Security Symposium, Feb. 2008, 19 pages.
"Internet Security Threat Report", 2011 Trends, vol. 17, Apr. 2012, pp. 1-52.
Jiang, N. et al., "Identifying Suspicious Activities through DNS Failure Graph Analysis", IEEE International Conference on Network Protocols (ICNP), Oct. 5-6, 2010, pp. 144-153.
Kang, U. et al., "Inference of Beliefs on Billion-Scale Graphs", The 2nd Workshop on Large-scale Data Mining: Theory and Applications, Jul. 25, 2010, 7 pages.
Ma, J. et al., "Beyond Blacklists: Learning to Detect Malicious Web Sites from Suspicious URLs", Proceedings of the 15th ACM SIGKDD international conference on Knowledge discovery and data mining, 2009, pp. 1245-1254.
Manadhata, P. K. et al., "Detecting Malicious Domains via Graph Inference", Computer Security, Lecture Notes in Computer Science, vol. 8712, 2014, pp. 1-18.
McAfee TrustedSource, accessed at http://www.trustedsource.org, accessed on Dec. 17, 2014, 1 page.
McEliece, R. J. et al., "Turbo Decoding as an Instance of Pearl's "Belief Propagation" Algorithm", IEEE Journal on Selected Areas in Communications, vol. 16, Issue 2, Feb. 1998, pp. 140-152.
McGrath, D. K and Gupta, M., "Behind phishing: an examination of phisher modi operandi", Proceedings of the 1st Usenix Workshop on Large-Scale Exploits and Emergent Threats, Article No. 4, Apr. 2008, 8 pages.
McPherson, M. et al., "Birds of a Feather: Homophily in Social Networks", Annual Review of Sociology, vol. 27, Aug. 2001. pp. 415-444.
Mills, E., "Malware delivered by Yahoo, Fox, Google ads", Mar. 22, 2010, accessed at http://news.cnet.com/8301-27080_3-20000898-245.html, accessed on Dec. 17, 2014, 4 pages.
Murphy, K. P. et al., "Loopy belief propagation for approximate inference: an empirical study", Proceedings of the Fifteenth conference on Uncertainty in artificial intelligence, 1999, pp. 467-475.
Nagaraja, S. et al., "BotGrep: Finding P2P Bots with Structured Graph Analysis", Proceedings of the 19th USENIX conference on Security, 2010, 16 pages.
Pandit, S. et al., "Netprobe: a fast and scalable system for fraud detection in online auction networks", Proceedings of the 16th international conference on World Wide Web, May 8-12, 2007. pp. 201-210.
Pearl, J., "Reverend bayes on inference engines: A distributed hierarchical approach", Proceedings of the National Conference on Artificial Intelligence, 1982, pp. 133-136.
Provos, N. et al., "All your iFRAMEs point to Us", Proceedings of the 17th conference on Security symposium, 2008, pp. 1-15.
Rajab, M. A., "A multifaceted approach to understanding the botnet phenomenon", Proceedings of the 6th ACM SIGCOMM conference on Internet measurement, 2006, pp. 41-52.
Robtex, "Robtex Swiss Army Knife Internet Tool", accessed at http://www.robtex.com, accessed on Dec. 17, 2014, 6 pages.
Stringhini, G. et al., "Botmagnifier: Locating Spambots on the Internet", USENIX Security Symposium, 2011, 16 pages.
Thomas, K. et al., "Design and Evaluation of a Real-Time URL Spam Filtering Service", IEEE Symposium on Security and Privacy, May 22-25, 2011. pp. 447-462.
Venkataraman, S. et al., "Exploiting Network Structure for Proactive Spam Mitigation", 16th USENIX Security Symposium, May 22, 2007, pp. 149-166.
Weimer, F., "Passive DNS Replication", Proceedings of FIRST Conference on Computer Security Incident Handling, Apr. 2005, 13 pages.
WOT: Web of Trust, "Know which websites to trust", accessed at http://mywot.com, accessed on Dec. 17, 2014, 1 page.
Xie, Y. et al., "Spamming Botnets: Signatures and Characteristics", SIGCOMM, 2008, pp. 171-182.
Yadav, S. and Reddy, A.L. N., "Winning with DNS Failures: Strategies for Faster Botnet Detection", Security and Privacy in Communication Networks, Lecture Notes of the Institute for Computer Sciences, Social Informatics and Telecommunications Engineering, vol. 96, 2012, 10 pages.
Yadav, S. et al., "Detecting Algorithmically Generated Malicious Domain Names", Proceedings of the 10th ACM SIGCOMM conference on Internet measurement, 2010, pp. 48-61.
Yedidia, J. S. et al., "Understanding belief propagation and its generalizations", Exploring artificial intelligence in the new millennium, 2003, pp. 236-239.
Zdrnja, B. et al., "Passive Monitoring of DNS Anomalies", Proceedings of the 4th international conference on Detection of Intrusions and Malware, and Vulnerability Assessment, 2007. pp. 129-139.
Zhag, Y. et al., "Cantina: a content-based approach to detecting phishing web sites", Proceedings of the 16th international conference on World Wide Web, 2007, pp. 639-648.
Zhang, J. et al., "Highly predictive blacklisting",Proceedings of the 17th conference on Security symposium, 2008, pp. 107-122.
Guava: Google Core Libraries for Java 1.6+, Retrieved from the Internet: <https://code.google.com/p/guava-libraries> [retrieved on Dec. 22, 2014], 2 pages.

\* cited by examiner

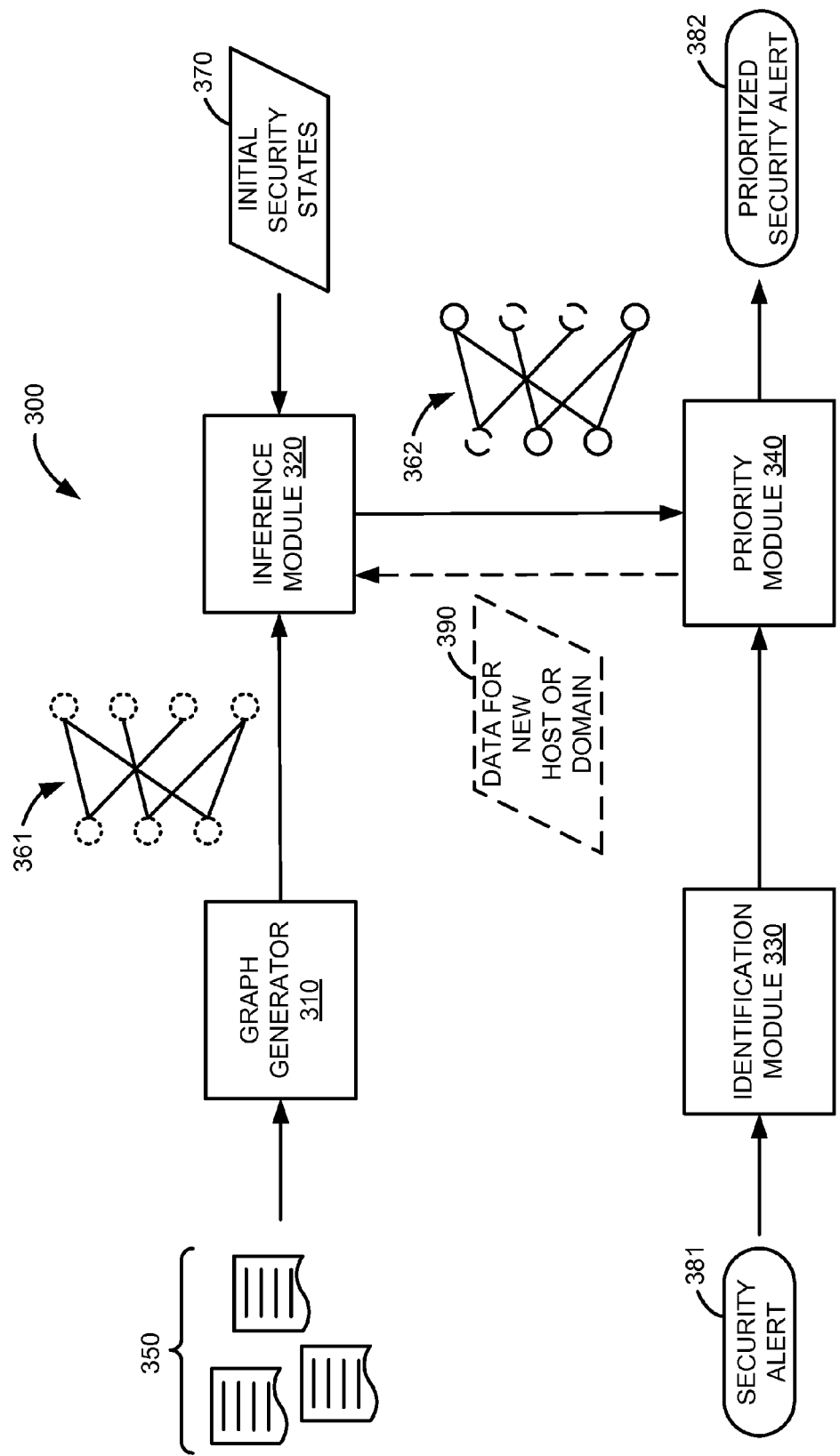

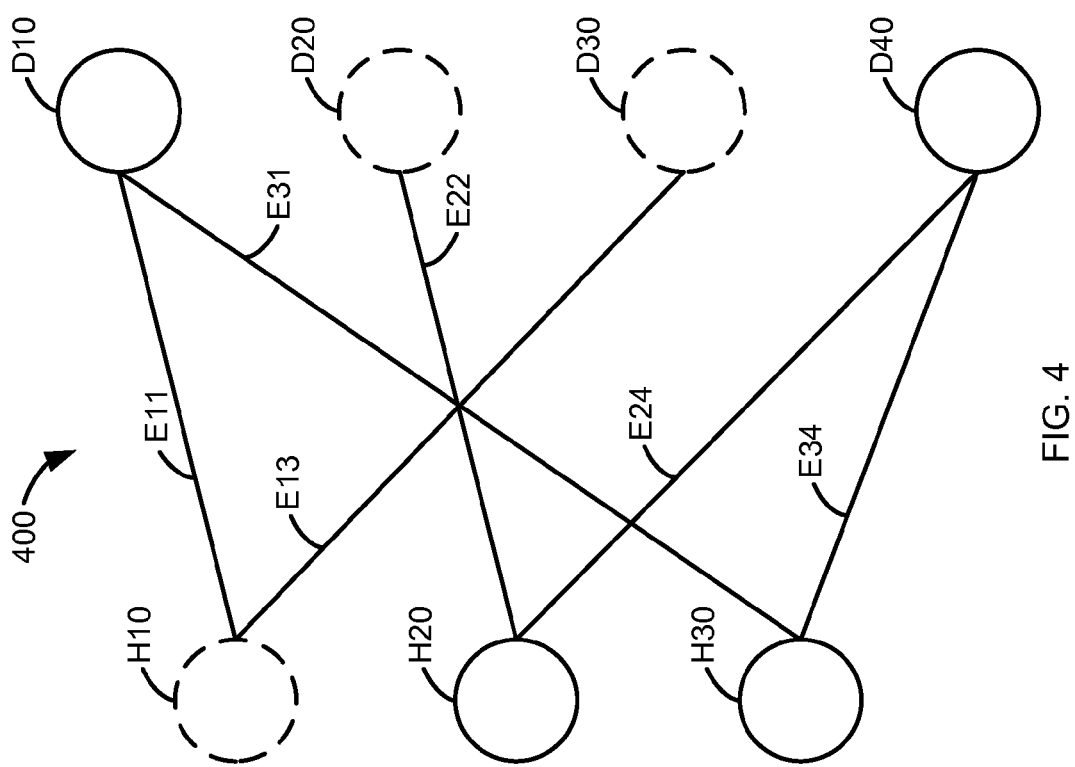

SECURITY ALERT PRIORITIZATION

BACKGROUND

Systems that monitor network traffic for an organization typically compare network traffic such as data packets or groups of data packets with a group of rules to determine whether that network traffic is suspicious or potentially malicious. If the network traffic satisfies or matches one or more rules, a security alert is generated by the system. Typically, the security alert is then provided to a security monitor for the organization.

Because distinguishing malicious from benign network traffic can be difficult, the rules are often designed to be broadly inclusive. As a result, many security alerts provided to a security monitor are false positives. Organizations often expend significant resources and effort to manually identify true positives in the security alerts provided to a security monitor.

BRIEF DESCRIPTION OF THE DRAWINGS

FIG. 3 is an illustration of operation of a security alert prioritization system, according to an implementation.

FIG. 4 is an illustration of a representation of a host-domain access map, according to an implementation.

FIG. 5 is an illustration of a representation of a host-domain access map, according to another implementation.

DETAILED DESCRIPTION

Figure 1:
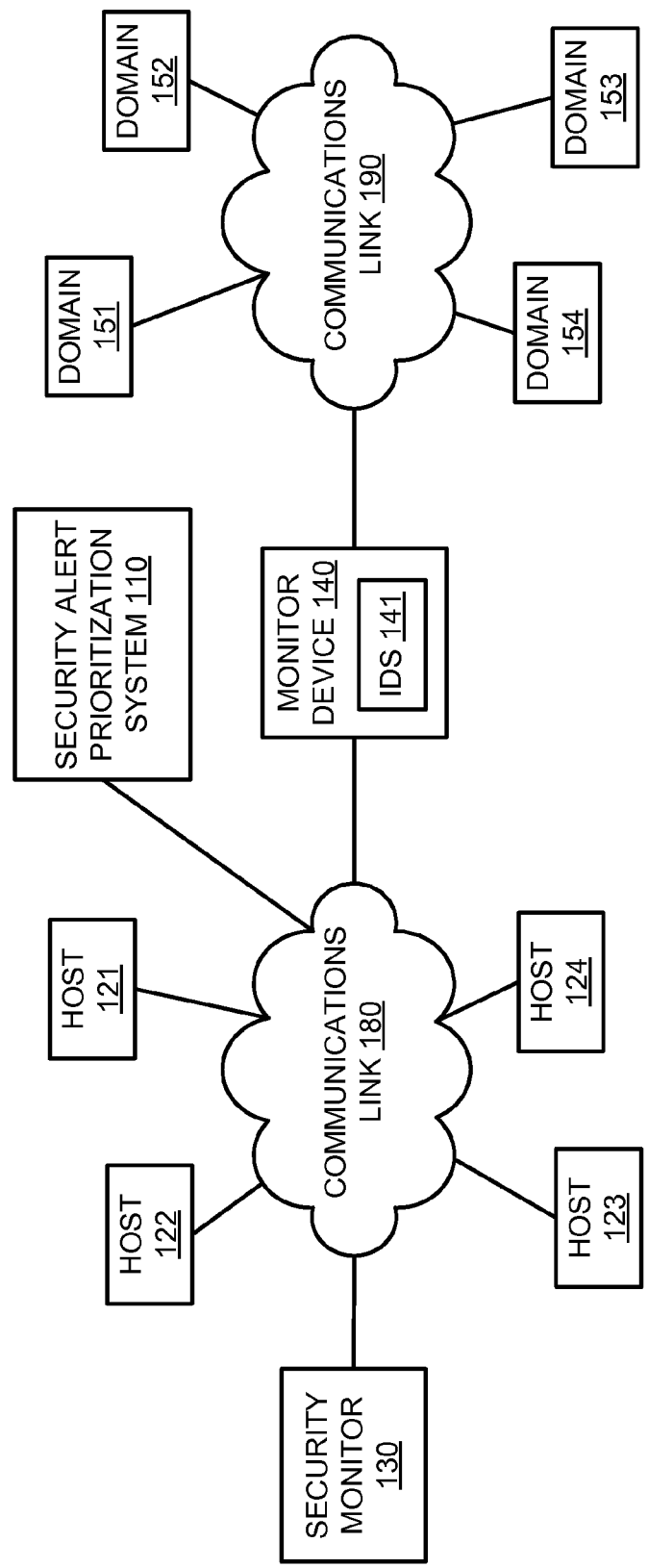
FIG. 1 is schematic block diagram of an environment including a security alert prioritization system, according to an implementation.

Identifying which security alerts are true positives or, conversely, identifying which security alerts are false positives can be a resource-intensive task for many organizations. Indeed, some organizations have inadequate resources to review or investigate the security alerts generated by intrusion detection systems of that organization. Furthermore, security alerts generated by intrusion detection systems are not typically prioritized to suggest which security alerts are most likely to identify security issues that are most (or more relative to others) significant. Thus, an organization is rarely provided with guidance regarding which security alerts should be reviewed or investigated. As a result, statistical data generated from the security alerts used to identify and characterize security issues, threats, or trends for an organization can be inaccurate.

Implementations discussed herein prioritize security alerts based on information inferred about the security state of hosts and domains from known or assumed initial security state for some hosts and domains. For example, an intrusion detection system can provide a security alert and an associated priority to a security monitor. As another example, a security monitor can prioritize security alerts using methods and systems discussed herein. Moreover, some implementations discussed herein provide environment- (or organization- or entity- or system-) specific priorities for security alerts based on communication between hosts within the environment and various domains. In some implementations, information is inferred about the security state of hosts and domains using belief propagation.

As an example, a security alert prioritization system generates a host-domain access map which describes network activity between hosts and domains. The host-domain access map can be represented as a graph in which hosts within an organization (e.g., an enterprise) and domains accessed by those hosts are represented by nodes, and edges connect nodes representing hosts to nodes represented domains accessed by those hosts. Generically, a portion of a host-domain access map at which information related to a host or a domain is stored can be referred to as a node of the host-domain access map. As a specific example, the host-domain access map can be generated from network activity records such as Dynamic Name System (DNS) and/or web proxy logs. In other words, the security alert prioritization system can parse network activity records to identify which hosts communicate with which domains, and generate or construct a host-domain access map based on this information.

The security alert prioritization system seeds the graph with initial security states (or ground truth information) for a small fraction of nodes. More specifically, for example, the security alert prioritization system labels a small fraction of nodes as malicious and benign, and the rest of the nodes are labeled as unknown (i.e., no information about the security state of those nodes is available or known). Such ground truth information can be accessed at, for example, DNS blacklists and whitelists. The security alert prioritization system then applies belief propagation to the host-domain access graph to estimate the nodes' marginal probabilities of being malicious. That is, each node's security state is determined based on the initial security states of the nodes labeled malicious or benign.

After a security alert is generated by, for example, an intrusion detection system, and received at the security alert prioritization system, the security alert prioritization system identifies a host and a domain associated with the security alert (e.g., the host and the domain between which network activity triggered the security alert) and accesses the security states of the host and the domain at the host-domain access map. The security alert prioritization system then determines a priority for the security alert based on the security states of the host and the domain. For example, the security alert prioritization system computes (or calculates) a priority for the security alert based on the security states of the host and the domain between which network activity triggered the security alert.

FIG. 1 is schematic block diagram of an environment including a security alert prioritization system, according to an implementation. The environment illustrated in FIG. 1 includes security alert prioritization system 110, hosts 121-124, security monitor 130, monitor device 140, domains 151-154, and communications links 180 and 190. Connections among the various components illustrated in FIG. 1 are logical, and do not necessarily represent physical connections.

Hosts 121-124 are entities such as computing systems or virtual machines that access domains 151-154. In some implementations, a host can be represented or identified by a host name, an Internet Protocol (IP) address, a Media Access Control (MAC) address, or some other identifier. Domains 151-154 are resources that are accessible via one or more communications links. In some implementations, a domain can be represented or identified by a Uniform Resource Identifier (URI) such as a Uniform Resource Locator (URL) or by an IP address. As an example, a host can be a computing system hosting an Internet browser and domain 151 can be a web site accessed at a URL by the Internet browser.

As illustrated in FIG. 1, hosts 121-124 are coupled to communications link 180 located on one side (or segment) of monitor device 140, and domains are 151-154 are coupled to communications link 190 located on a different side (or segment) of monitor device 140. In some implementations, some or all of domains 151-154 can be coupled to communications link 180. That is, at least some of domains 151-154 can be on the same side of monitor device 140 as hosts 121-124.

Monitor device 140 is an entity such as a computing system or virtual machine through which network traffic between hosts 121-124 and domains 151-154 is routed. As illustrated in FIG. 1, monitor device 140 is logically located between communications links 180 and 190. In some implementations, monitor device can operate within a single communications link, and network traffic between hosts and domains can be routed through or to (e.g., mirrored to) monitor device 140.

Intrusion detection system (labeled "IDS") 141 analyzes that network traffic (e.g., data packets via which hosts 121-124 access hosts 151-154) to determine whether that network traffic may be malicious, and generates (or raises) security alerts based on that analysis. For example, monitor device 140 can be a server hosting IDS 141. That is, IDS 141 can be implemented as software hosted at monitor device 140. As another example, monitor device 140 can be a network appliance at which IDS 141 is implemented as logic within one or more integrated circuits (or hardware), software hosted at a processor, or as a combination thereof.

As used herein, an "intrusion detection system" is a module or group of modules that analyzes network traffic and raises security alerts if that network traffic is determined to be or to potentially be malicious. As such, the term "intrusion detection system" refers to typical intrusion detection systems, intrusion prevention systems, and similar systems. Also, as used herein, a "security alert" is an indication that some network traffic such as a data packet, a group of data packets, or a network stream has been determined to be or to potentially be malicious (or to be suspicious). For example, a security alert can be a data set including an identifier of a host, an identifier of a destination, and an identifier or description of a basis of the security alert (e.g., an identifier of a rule that was satisfied to trigger the security alert). Such a security alert can be raised (e.g., generated and sent via a communications interface) at an intrusion detection system if a data packet matches (or satisfies) a rule at the intrusion detection system.

Communications links 180 and 190 each include devices, services, or combinations thereof that define communications paths between hosts, domains, and/or other devices or services. For example, communications links 180 and 190 can each include one or more of a cable (e.g., twisted-pair cable, coaxial cable, or fiber optic cable), a wireless link (e.g., radio-frequency link, optical link, or sonic link), or any other connectors or systems that transmit or support transmission of signals. Moreover, communications links 180 and 190 can each include communications networks such as a switch fabric, an intranet, the Internet, other telecommunications networks, or a combination thereof. Additionally, communications links 180 and 190 can each include proxies, routers, switches, gateways, bridges, load balancers, and similar communications devices.

Security monitor 130 receives security alerts from monitor device 140 (or IDS 141). For example, security monitor 130 can be an application hosted at a computing system that includes a graphical user interface (GUI) at which a user such as a system administrator can view or access security alerts. In some implementations, security monitor 130 includes or communicates with a data store such as a database, filesystem, or storage device such as a hard disk drive (HDD) or solid-state drive (SSD) at which security alerts raised at monitor device 140 (or IDS 141) are stored.

Security alert prioritization system 110 prioritizes security alerts based on a host and a domain associated with those security alerts. Security alert prioritization system 110 can be, for example, a standalone application hosted at a computing system or an appliance as illustrated in FIG. 1, can be part of an intrusion detection system, or can be part of a security monitor. As discussed above, a security alert is raised when network traffic (e.g., a data packet, a group of data packets, or a data stream) matches a rule or trigger. Network traffic is associated with a host and a domain. That is, a host is a source or destination of the network traffic and a domain is a destination or source, respectively, of the network traffic. Thus, a security alert raised in response to some network traffic can be said to be associated with the host and the domain of that network traffic.

Figure 2:
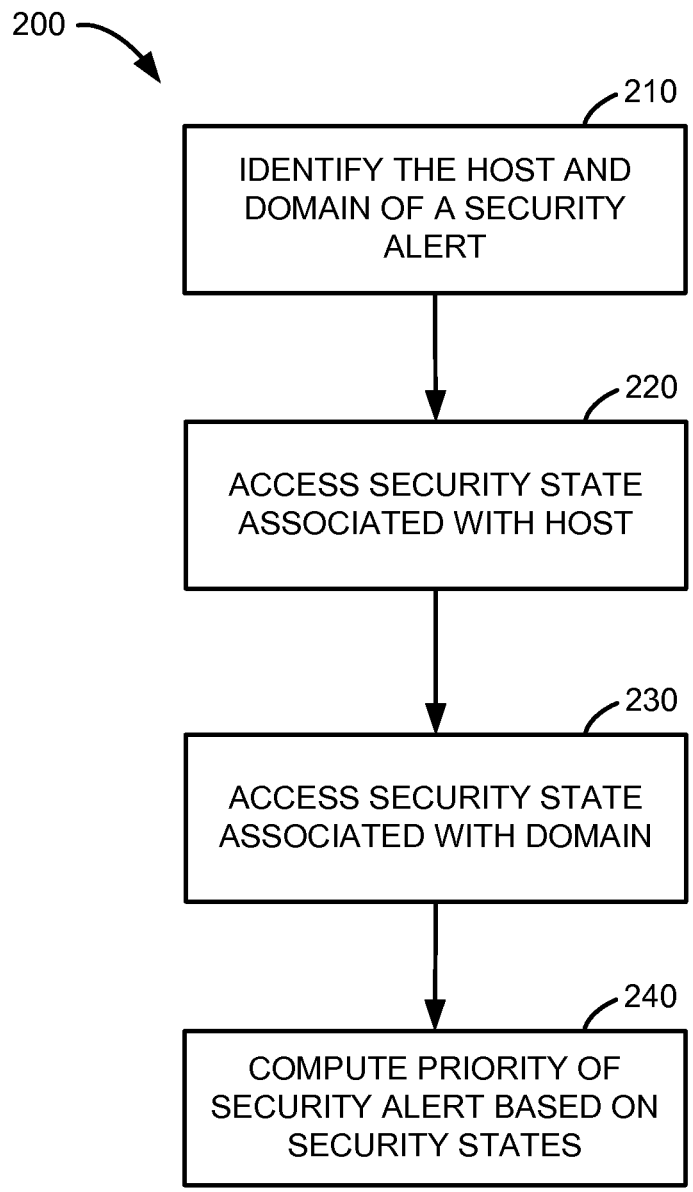
FIG. 2 is a flowchart of a process to prioritize security alerts, according to an implementation.

Security alert prioritization system 110 prioritizes security alerts. For example, FIG. 2 is a flowchart of a process to prioritize security alerts, according to an implementation. As illustrated in FIG. 2, a security alert prioritization system identifies or determines the host and the domain associated with a security alert at block 210. For example, a security alert can include an IP address or a MAC address of a host and a URL representing a domain. As another example, a security alert can include an IP address of a host and a URL representing a domain, and the security alert prioritization system can parse IP address lease information (e.g., Dynamic Host Configuration Protocol (DHCP) logs) to identify a MAC address or host name of the host.

At block 220, the security alert prioritization system accesses a security state of the host. As used herein, a "security state" is a value or group of values that represent a security risk. For example, a security state can be a value that represents a probability that a host or a domain is a severe security risk (or malicious). As a more specific example, if the security state can have a value between 0 and 1.0. If the security state is 0.9, the host or the domain associated with the security state is likely to be severe (e.g., to pose a significant or high security risk or be malicious). If the security state is 0.1, the host or the domain associated with the security state is likely to be low (e.g., to pose a low security risk or be benign). As another example, a security state can be a binary value of "severe" or "benign."

As yet another example, a security state can be a multiclass classification vector. A multiclass classification vector is a group of values, each of which represents a likelihood or probability that a host or a domain is associated with a particular class of security risk. More specifically, for example, a multiclass classification vector can include four values: one value representing the probability that an associated host or domain poses a low (or benign) security risk, one value representing the probability that an associated host or domain poses a moderate security risk, one value representing the probability that an associated host or domain poses a high security risk, and one value representing the probability that an associated host or domain poses a severe security risk.

As discussed in more detail herein, security states can be derived using belief propagation based on initial security states assigned to a small number of hosts and/or domains. The security state of the host accessed at block 220 can be accessed at a portion of a table within a memory, a portion of a database, or a particular memory address associated with the host. As a specific example, an identifier of the host such as a MAC address or host name (or a hash thereof) can be used as a key to access (e.g., lookup) the security state of or associated with the host. Similarly, a security state of the domain is accessed at block 230.

The security alert prioritization system then computes a priority for the security alert based on the security state of the host and the security state of the domain at block 240. In other words, the security alert prioritization system can determine a priority for the security alert based on the security state of the host and the security state of the domain. The priority can be computed or determined using a variety of methodologies. For example, if the security states are binary values, of "severe" or "benign," the priority can be "high" if both security states are "severe," "moderate" if one security state is "severe" and the other security state is "benign," and "low" if both security states are "benign." As another example, if the security states are binary values, of "severe" or "benign," the priority can be "high" if the security state of the domain is "severe," "moderate" if the security state of the host is "severe" and the other security state of the domain "benign," and "low" if both security states are "benign." As yet another example, if the security states are multiclass classification vectors, the security states can be combined to determine a probability representing the joint probability of each class represented in the security states, and the priority can be determined based on the probability for that class.

In some implementations, as discussed above, a priority is a class such as "high," "moderate," or "low." In other implementations, a priority can be a number, for example, between 0 and 1.0, between 1 and 10, or between 1 and 100. As another example, a priority can be a color along a spectrum that indicates the severity or security risk associated with the priority. As another example, a priority can be multiclass classification vector to indicate a probability for each class of a group of classes. More specifically, for example, a priority can include three values that represent the probabilities that a security alert is a high security risk, a moderate security risk, and a low security risk.

Such priorities can reduce the burden on an organization of reviewing false positives. For example, a security alert raised in response to network traffic between a host and a domain that each have security states indicating a low security risk can be assigned a low priority and assumed to be a false positive. Similarly, a security alert raised in response to network traffic between a host and a domain that each have security states indicating a high or severe security risk can be assigned a high priority, and review and/or investigated.

Process 200 illustrated in FIG. 2 is an example process to prioritize security alerts. Other implementations can include additional and/or rearranged blocks or steps. For example, in some implementations, if a host or domain is unknown, a security alert prioritization system can access a default security state for that host of domain. More specifically, a host or domain can be unknown if the security alert prioritization system does not have or is unable to access a security state for that host or domain. The default security state can be a predetermined value. For example, the default security state can be "severe," or can be "benign." As another example, the default security state can be a multiclass classification vector in which the probabilities for each class are equal. In some implementations, the default security state can be applied to a node added to a host-domain access map (and representing the previously unknown host or domain) to which belief propagation is applied, and the security state can be accessed after the belief propagation is applied to the host-domain access map.

FIG. 3 is an illustration of operation of a security alert prioritization system, according to an implementation. Security alert prioritization system 300 includes graph generator (or graph generator module) 310, inference module 320, identification module 330, and priority module 340. Although these particular modules (i.e., combinations of hardware and software) and various other modules are illustrated and discussed in relation to FIG. 3 and other example implementations, other combinations or sub-combinations of modules can be included within other implementations. Said differently, although the modules illustrated in FIG. 3 and discussed in other example implementations perform specific functionalities in the examples discussed herein, these and other functionalities can be accomplished, implemented, or realized at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules.

Graph generator 310 accesses network activity records 350 to generate host-domain access map 361. Network activity records describe and/or record network traffic between hosts and domains. For example, network activity records can be included in network proxy log files, Dynamic Name System (DNS) log files, security alerts, web server logs, and/or one or more data stores that record accesses or requests for access between hosts and domains.

A host-domain access map is a data structure that describes which hosts have exchanged network traffic with (or accessed) which domains. As examples of host-domain access maps, FIG. 4 is an illustration of a representation of a host-domain access map, according to an implementation, and FIG. 5 is an illustration of a representation of a host-domain access map, according to another implementation. Host-domain access map 400 in FIG. 4 is represented as a graph. The graph includes nodes H10, H20, and H30 representing hosts; nodes D10, D20, D30, and D40 represented domains; and edges E11, E13, E22, E24, E31, and E34 representing accesses between those nodes.

More specifically, edge E11 indicates that a host associated with node H10 exchanged are attempted to exchange network traffic with a domain associated with node D10; edge E13 indicates that a host associated with node H10 exchanged are attempted to exchange network traffic with a domain associated with node D30; edge E22 indicates that a host associated with node H20 exchanged are attempted to exchange network traffic with a domain associated with node D20; edge E24 indicates that a host associated with node H20 exchanged are attempted to exchange network traffic with a domain associated with node D40; edge E31 indicates that a host associated with node H30 exchanged are attempted to exchange network traffic with a domain associated with node D10; and edge E34 indicates that a host associated with node H30 exchanged or attempted to exchange network traffic with a domain associated with node D40. Each node can include a security state for the host or domain associated with that node. For example, the nodes illustrated with dashed lines (i.e., nodes H10, D20, and D30) can have a malicious or severe security state, and the nodes illustrated with solid lines (i.e., nodes H20, H30, D10, and D40) can have a benign security state.

Although illustrated graphically in FIG. 4, a graph can be stored within a memory of a computing system, where each node occupies a number of memory locations at which data representing the security state, an identifier of the host of domain associated with that node, and a group of memory location addresses (or pointers) representing edges to other nodes. Host-domain access map 500 in FIG. 5 is represented as a table, in which each row represents access between the host and domain represented in the columns of that row.

For example, the first row includes information related to host H10 (e.g., an identifier and security state "M" for malicious of host H10) in the "HOSTS" column and information related to domain D10 (e.g., an identifier and security state "B" for benign of domain D10). Because host H10 and domain D10 are represented on a common row of the table, host H10 and domain D10 have exchanged or attempted to exchange network traffic. In other words, there has been an access between host H10 and domain D10. Similar to the graph illustrated in FIG. 4, the table illustrated in FIG. 5 can be stored at a memory with a computing system. For example, the table can be stored as a two-dimensional array or vector within a memory.

Referring to FIG. 3, graph generator 310 generates host-domain access map 361 from network activity records 350 by, for example, parsing network activity records 350 to identify which hosts communicate with which domains. As illustrated in FIG. 3, host-domain access map 361 is a graph in which hosts and domains are illustrated as nodes, and each edge indicates that a host and a domain associated with the nodes connected to that edge exchanged data. That is, an edge connecting two nodes represents one or more accesses between the host and the domain associated with those nodes (i.e., that the host accessed the domain or that the domain accessed the host).

Graph generator 310 can generate host-domain access map 361 using a variety of methodologies and information included within network activity records 350. For example, graph generator 310 can add nodes to a graph or entries to rows of a table when an entry within network activity records 350 includes a reference to or identifier of a host or domain that is not already included in host-domain access map 361. Additionally, graph generator 310 can add an edge to a graph or entries to rows of a table when an entry within network activity records 350 indicates access between a host and a domain.

As a specific example, network activity records 350 can include records of DNS requests, and graph generator 310 can modify host-domain access map 361 to represent an access between a host and a domain for each DNS request. As another example, network activity records 350 can include records of security alerts raised by an intrusion detection system, and graph generator 310 can modify host-domain access map 361 to represent an access between a host and a domain for each security alert. As yet another example, network activity records 350 can include Hypertext Transfer Protocol (HTTP) request records, and graph generator 310 can modify host-domain access map 361 to represent an access between a host and a domain for each HTTP request. Such modifications can include, for example, adding nodes and/or edges to a graph.

The circles representing nodes in host-domain access map 361 (edges are represented by lines extending between pairs of nodes) are illustrated with dotted lines to indicate than no security state is currently associated with the hosts and the domains associated with those nodes. In other words, host-domain access map 361 does not include security state information for the hosts or the domains represented in host-domain access map 361. Inference module 320 accesses host-domain access map 361 and initial security states 370 to define security states for host-domain access map 361, resulting in host-domain access map 362. Host-domain access map 362 can be a new host-domain access map or host-domain access map 361 in which nodes representing hosts and domains are associated with (e.g., annotated to identify) security states of those hosts and domains.

Initial security states 370 includes information about the security states of a small subset of the hosts and the domains represented in host-domain access map 361. For example, in some implementations, initial security states 370 includes information related to the security states of less than 15%, less than 10%, or less than 5% of the hosts and the domains. Initial security states 370 can include, for example, a white list of hosts and domains that are assumed to be benign (or secure) and/or a black list of hosts and domains that are assumed to be malicious (or insecure or compromised). In other implementations, initial security states 370 can include multiclass classification vectors associated with hosts and/or domains represented in host-domain access map 361.

Inference module 320 uses initial security states 370 to define security states of each host and domain in host-domain access map 361 to produce host-domain access map 362. Host-domain access map 362 includes nodes that are illustrated with dashed and solid lines. The nodes with dashed lines are associated with hosts and domains that have malicious (or severe) security states. The nodes with solid lines are associated with hosts and domains that have benign security states. As discussed above, in other implementations, a security state can be represented by multiclass classification vectors or other values other than binary "benign" or "severe" values.

As a specific example, inference module 320 can apply belief propagation to host-domain access map 361 to define a security state for each host and domain represented in host-domain access map 361. In this example, reference will be made to host-domain access map 361 as a graph. The methodologies discussed herein are also applicable to other representations of host-domain access graphs such as tables.

Inference module 320 uses initial security states 370 to establish ground truth to define a security state for each host and domain in host-domain access map 361. In other words, initial security states 370 can be ground truth or seed data for belief propagation using the access information represented by host-domain access map 361. Inference module 320 can assign initial security states from initial security states 370 to nodes (or hosts and domains represented by the nodes) in host-domain access map 361 for which initial security states 370 include initial security states. Similarly, inference module 320 can assign unknown security states to nodes in host-domain access map 361 for which initial security states 370 do not include initial security states.

For example, the unknown security states of such nodes can be neither a "benign" nor a "severe" initial security state. As another example, the unknown security states of such nodes can be a multiclass classification vector in which each class is assigned an equal probability. As yet another example, the unknown security states of such nodes can be a multiclass classification vector in which each class is assigned a predetermined probability.

Typically, there are many more (e.g., multiple times as many) nodes (or hosts and domains represented by the nodes) with unknown security states than nodes with initial security states. Thus, security states can be determined or defined for many hosts and domains using a relatively small amount of ground truth related to the security risks of hosts and domains represented in host-domain access map 361.

After initial security states and unknown security states are assigned to the nodes of host-domain access map 361, inference module 320 applies iterations of belief propagation to host-domain access map 361 until the iterations converge.

That is, inference module 320 applies iterations of belief propagation to host-domain access map 361 until the iterations of belief propagation do not change the security states of the nodes significantly (i.e., more than a predetermined amount).

Each iteration of belief propagation involves exchanging messages between nodes (representing hosts and domains) of host-domain access map 361 between which host-domain access map 361 indicates an access. In other words, in each iteration messages are exchanged between nodes representing hosts and domains that have exchanged network traffic (e.g., data). More specifically, for each host and domain that have exchanged network traffic, the node representing the host sends a message to the node representing the domain, and the node representing the domain sends a message to the node representing the host. Referring to the graph representation of host-domain access map 362 illustrated in the FIG. 3, the messages are exchanged along edges connecting nodes. The messages indicates a believed security state (e.g., probability or probabilities for multiclass classification vectors of a security state) that the originator node of the message determines for the destination node of the message. The originator node determines this believed security state based on its own current security state, and a weight function between itself and the destination node.

The weight function can be, for example, an edge potential function such as an edge potential matrix that describes weights to be applied to a security state of an originator node based on the security state of the originator node and the security state of a destination node. As a specific example, if the security state is a probability (e.g., number between 0 and 1.0) that a node is malicious, the weight function can be an edge potential matrix of two rows and two columns having four values. The security state of the originator node can be modified (e.g., multiplied) by a first value from the edge potential matrix to define the believed security if the security state of the originator node is benign (e.g., less than 0.5) and the security state of the destination node is benign; by a second value from the edge potential matrix to define the believed security if the security state of the originator node is malicious (e.g., greater than or equal to 0.5) and the security state of the destination node is malicious; by a third value from the edge potential matrix to define the believed security if the security state of the originator node is benign and the security state of the destination node is malicious; or by a fourth value from the edge potential matrix to define the believed security if the security state of the originator node is malicious and the security state of the destination node is benign.

In other implementations, the weight function can be some other edge potential function based on the security state of an originator node and a destination node for a message. The value of the weight function for those nodes is used to modify the security state of the originator node to determine a believed security state for the destination node, which is included in the message provided to the destination node. The believed security state (e.g., the security state of the originator node as modified by the value of the weight function) is the originator node's belief of the security state of the destination node. After receiving the message, the destination node modifies its own security state based on its current security state and the believed security state included in the message. As discussed above, a security state can also be other values or groups of values such as multiclass classification vectors. When believed security states included in the messages converge to (e.g., do not significantly differ from) the current security states of the destination nodes, the belief propagation can be said to have converged.

Applying belief propagation to host-domain access map 361 to define host-domain access map 362 can be particularly beneficial over other techniques such as marginal probability calculation because belief propagation is less computationally intensive. Also, belief propagation can converge to accurate security states for all nodes in host-domain access map 361 using little ground truth (i.e., with only a small number of nodes having initial security states in comparison to the number of nodes having unknown security states).

Moreover, the methods and systems discussed herein can accurately assign priorities to security alerts because the security states associated with hosts and domains in a host-domain access map are specific to a particular organization operating a security alert prioritization system. That is, the host-domain access map is generated from network activity records of the organization and is, therefore, specific or particular to the organization (i.e., the host-domain access map describes accesses between hosts of the organization and domains). Thus, the belief propagation applied to the host-domain access map derives security states for all the hosts and domains represented in the host-domain access map from the initial security states according to the structure of the host-domain access map, which is specific to the organization.

Figure 6:
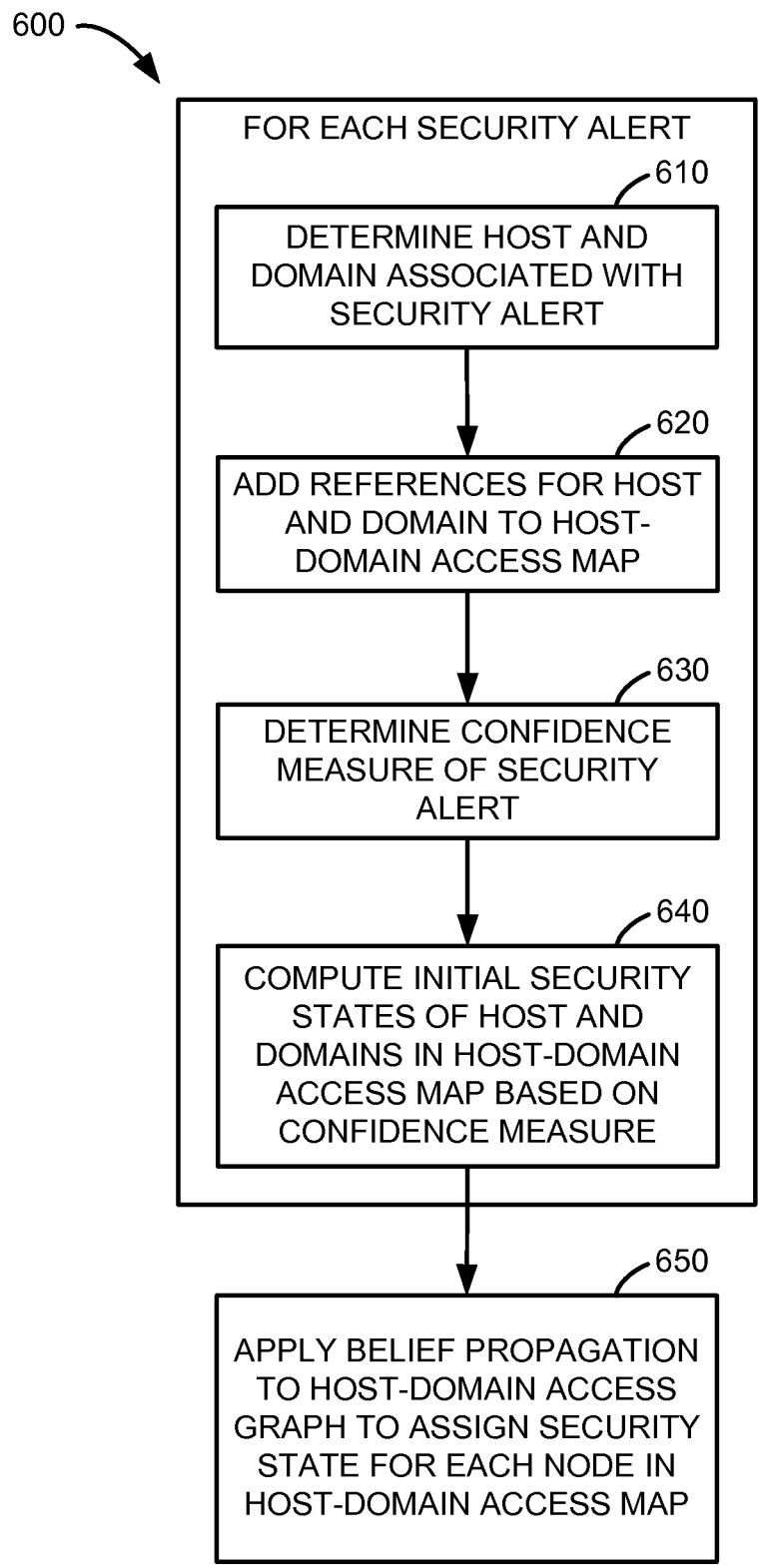
FIG. 6 is a flowchart of a process to generate a host-domain access map including security states for hosts and domains, according to an implementation.

As an example of generating a host-domain access map with security states associated with hosts and domains represented in the host-domain access map, FIG. 6 is a flowchart of a process to generate a host-domain access map including security states for hosts and domains, according to an implementation. In this example, with reference to FIG. 3, network activity records 350 include security alerts generated at an intrusion detection system, and blocks 610, 620, 630, and 640 are repeated for each security alert.

At block 610, the host and domain associated with a security alert. For example, graph generator 310 can parse the security alert to identify identifiers of the host and the domain associated with the security alert (e.g., between which network traffic matched a rule to trigger the security alert). At block 620, references to the host and the domain (e.g., nodes in a graph or rows in a table including the identifiers of the host and the domain) are then added to a host-domain access map at block 620. In some implementations, such as implementations in which the host-domain access map is represented as a graph, the host-domain access map is modified to indicate access between the host and the domain. More specifically, for example with reference to a graph, an edge can be added between nodes representing the host and the domain.

A confidence measure related to (or associated with or of) the security alert is then determined at block 630. For example, the security alert can include a confidence measure within the security alert. As another example, initial security states 370 can include confidence measures for some rules of an intrusion detection system, and the security alert can include an identifier of the rule that was satisfied to trigger generation of the security alert. Such confidence measures can be assigned to rules of an intrusion detection system by, for example, a domain expert based on an analysis of those rules. Inference module 320, for example, can use the identifier of the security rule to select a confidence measure from initial security states 370 that is related to the security alert. If a confidence measure is not available or accessible for a security alert, process 600 can return to block 610 to handle another security alert. In other words, no initial security state will be determined for the host and the destination for a security alert with no associated (or related) confidence measure.

A confidence measure is a value (or group of values) that indicates a confidence in a rule that triggers a security alert. For example, a rule that results in few false positive security alerts (i.e., security alerts that indicate malicious network activity raised in response to network activity that is benign) can have a high confidence measure (i.e., high confidence is given to that rule). A rule that frequently results in false positive security alerts can have a low confidence measure (i.e., low confidence is given to that rule). Security alerts raised by a rule with a confidence measure can be said to be related to (or associated with) that confidence measure. Thus, security alerts associated with a high confidence measure can be assumed to be triggered by malicious network activity. Accordingly, the host and the domain associated with that security alert can be assigned an initial security state indicating a relatively high probability that the host and the domain are malicious.

At block 640, the confidence measure is used to compute initial security states for the host and the domain. These initial security states are then assigned to the host and the domain. For example, the initial security states of the host and the domain can be determined (or computed) to be malicious if any confidence measure is related to the security alert (e.g., is associated with the rule that was matched to trigger the security alert). In other implementations, the initial security states of the host and the domain can be computed based on a value or values of the confidence measure. For example, values can be assigned to a multiclass classification vector based on a value of a confidence measure. More specifically, for example, values for classes of a multiclass classification vector that represent severe and high security risks can be indicate high probabilities and values for classes of the multiclass classification vector that represent moderate and low security risks can indicate low probabilities if a confidence measure has a value representing a high confidence. Said differently, the initial security states of a host and domain associated with a security alert are computed or determined to be proportional or correspond to the confidence measure related to that security alert.

In some implementations, an initial security state can have previously been computed for and assigned to the host and/or the destination. For example, the host and/or the destination can have been associated with a previously handled security alert. Under such conditions, the previously-assigned initial security state can be modified at block 640. For example, an initial security state representing a probability that the host or the domain is malicious can be increased at block 640 if the confidence measure indicates a high confidence associated with the security alert (e.g., the rule matched to trigger generation of the security alert is likely to generate true positives). As another example, a probability that the host or the domain is malicious can be decreased at block 640 if the confidence measure indicates a low confidence associated with the security alert (e.g., the rule matched to trigger generation of the security alert is likely to generate false positives).

After blocks 610, 620, 630, and 640 have been performed for all the security alerts, process 600 proceeds to block 650. At block 650, belief propagation is applied to the host-domain access map to determine a security state of each host and domain represented in the host-domain access map based on the initial security states determined at block 640. As discussed above, not every host and domain represented in the host-domain access map is assigned an initial security state. Belief propagation is applied at block 650 to determine a security state of each host and domain represented in the host-domain access map based on the initial security states for hosts and domains computed during iterations of blocks 610, 620, 630, and 640. Thus, a host-domain access map with security states associated with hosts and domains represented in the host-domain access map using security alerts raised by an intrusion detection system.

Referring again to FIG. 3, after security alert 381 is received by security alert prioritization system 300, identification module 330 determines or identifies a host and a domain associated with security alert 381. For example, security alert 381 can be generated at an intrusion detection system (or monitor device) based on network traffic exchanged between a host and a domain, and can include an identifier of the host and an identifier of the domain. As a specific example, security alert 381 can include an IP address of the host and a URL of the domain. Identification module 330 can extract the second-level domain of the domain from the URL, and identify a MAC address of the host by parsing DHCP logs to determine to which MAC address the IP address is currently leased. The second-level domain and MAC address can be used to identify the domain and the host, respectively, associated with security alert 381. In other implementations, identification module 330 can determine other identifiers such as IP addresses, IP address ranges, host names, or other identifiers for a host and a domain associated with a security alert.

Identification module 330 then provides the identifiers of the host and the domain associated with security alert 381 to priority module 340. In some implementations, identification module 330 also provides security alert 381 to priority module 340. Priority module 340 determines a priority of security alert 381 using the identifiers of the host and the domain associated with security alert 381 and security states of the host and the domain from host-domain access map 362. As discussed above, a host-domain access map such as host-domain access map 362 includes identifies of the hosts and the domains represented within the host-domain access map. Priority module 340 receives host-domain access map 362 from inference module 320 (or accesses host-domain access map 362 at a memory at which inference module 320 stored host-domain access map 362), and identifies nodes of host-domain access map 362 that match the identifiers of the host and the domain associated with security alert 381.

Priority module 340 then accesses the security state of those nodes to determine the security state of the host and the security state of the domain, and computes or determines a priority of security alert based on the security state of the host and the security state of the domain. For example, priority module 340 can access a lookup table of priorities indexed by the security states of the host and the domain. As a specific example, if the security states of the host and the domain are binary with values of "severe" and "benign," a high priority can be determined for security alert 381 if the security state of the host is severe and the security state of the domain is severe, a low priority can be determined for security alert 381 if the security state of the host is benign and the security state of the domain is benign, a moderate priority can be determined for security alert 381 if the security state of the host is severe and the security state of the domain is benign, and a moderate priority can be determined for security alert 381 if the security state of the host is benign and the security state of the domain is severe. As another example, the security states of the host and the domain can be applied to a function to determine a priority of security alert 381. Such a function or lookup table can be multidimensional to determine a priority of security alert 381 if the security states of the host and the domain are multiclass classification vectors.

If the host and/or the domain are not included within host-domain access map 362, the host and/or the domain can be referred to as unknown. A default security state can be applied to the host and/or the domain, and the default security state used as the security state of the host and/or the domain. A default security state is a predetermined security state for unknown hosts and domains. For example, a default security state can include one or more values defining a probability or probabilities that a host or a domain is either malicious, benign, or in some other class or classes of security risk.

In some implementations, priority module 340 can provide information related to an unknown host or domain (e.g., an identifier of the host or domain and/or a default security state) to inference module 320. Inference module 320 can then add the new host or domain to host-domain access map 362, and determine a security state of the new host or domain. For example, priority module 340 can provide data (or information) for new host or domain 390 to inference module 320. Inference module 320 can then add the new host or domain to host-domain access map 362, perform belief propagation to host-domain access map 362 to determine or define a security state for the new host or domain, and provide a signal to priority module 340 to indicate that a security state is available for the new node or domain. Priority module 340 can then use that security state to determine a priority for security alert 381.

As another example, priority module 340 provides information for new host or domain 390 to inference module 320, and uses a default security state for the new host or domain to determine a priority for security alert 381. Inference module 320 can then at a later time based on a schedule or some event, perform belief propagation to host-domain access map 362 to determine or define security states for any new hosts or domains for which information is received from priority module 340.

As illustrated in FIG. 3, in some implementations, priority module 340 outputs prioritized security alerts. For example, priority module 340 can include a reporting module (not shown) to provide prioritized security alert 382 (e.g., security alert 381 and a related priority) to a security monitor. A reporting module communicates with a security monitor or group of security monitors to provide prioritized security alerts (e.g., security alerts with associated priorities) to the security monitor or group of security monitors.

As discussed above, priorities determined by a security alert prioritization system can be specific or particular to an organization operating the security alert prioritization system (or for which the security alert prioritization system is operated). Such organization- or environment-specific priorities are a result of the security states determined based on one or more host-domain access maps that are specific to the organization (or environment). Moreover, as discussed above in relation to FIG. 6, the initial security states can also be specific to the organization if they are determined based on security alerts generated in response to network activity of that organization.

Figure 7:
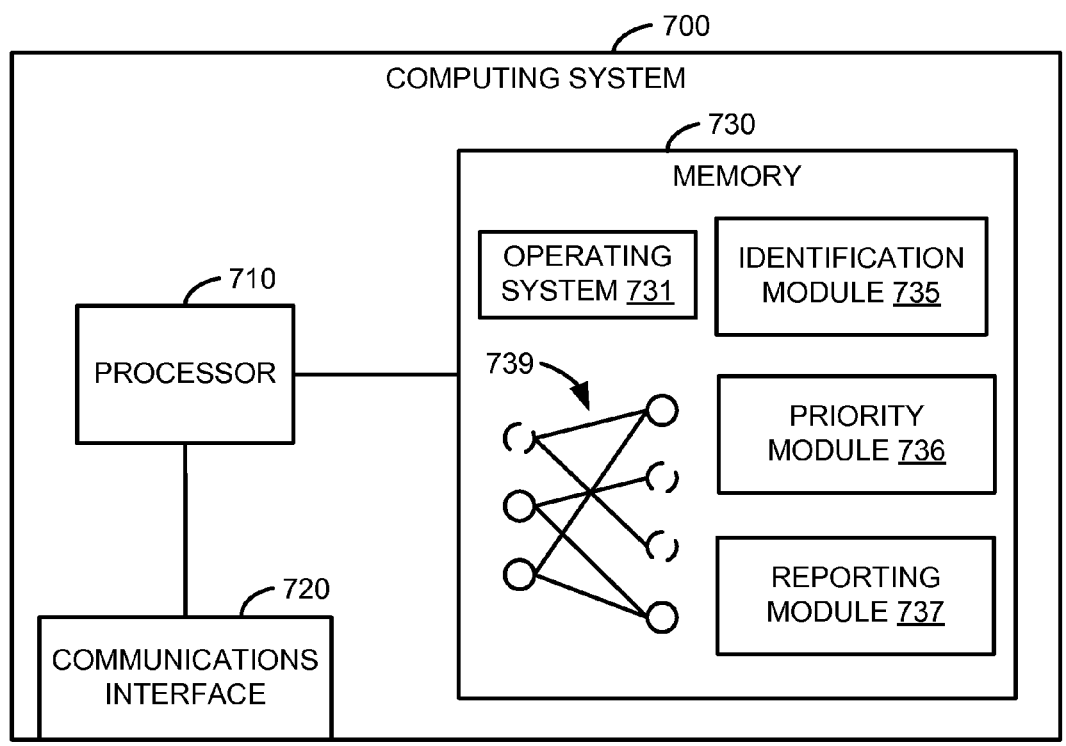
FIG. 7 is a schematic block diagram of a security alert prioritization system hosted at a computing system, according to an implementation.

FIG. 7 is a schematic block diagram of a security alert prioritization system hosted at a computing system, according to an implementation. In some implementations, a computing system hosting a security alert prioritization system is itself referred to as a security alert prioritization system. In the example illustrated in FIG. 7, computing system 700 includes processor 710, communications interface 720, and memory 730. Processor 710 is any combination of hardware and software that executes or interprets instructions, codes, or signals. For example, processor 710 can be a microprocessor, an application-specific integrated circuit (ASIC), a distributed processor such as a cluster or network of processors or computing systems, a multi-core or multi-processor processor, or a virtual or logical processor of a virtual machine.

Communications interface 720 is a module via which processor 710 can communicate with other processors or computing systems via communications link. For example, reporting module 737 can provide prioritized security alerts to a security monitor via communications interface 720, and identification module 735 can receive security alerts from an intrusion detection system via communications interface 720.

Communications interface 720 can include a network interface card and a communications protocol stack hosted at processor 710 (e.g., instructions or code stored at memory 730 and executed or interpreted at processor 710 to implement a network protocol) to receive and send data. As specific examples, communications interface 720 can be a wired interface, a wireless interface, an Ethernet interface, a Fiber Channel interface, an InfiniBand interface, an IEEE 802.11 interface, or some other communications interface via which processor 710 can exchange signals or symbols representing data to communicate with other processors or computing systems.

Memory 730 is a processor-readable medium that stores instructions, codes, data, or other information. As used herein, a processor-readable medium is any medium that stores instructions, codes, data, or other information non-transitorily and is directly or indirectly accessible to a processor. Said differently, a processor-readable medium is a non-transitory medium at which a processor can access instructions, codes, data, or other information. For example, memory 730 can be a volatile random access memory (RAM), a persistent data store such as a hard disk drive or a solid-state drive, a compact disc (CD), a digital video disc (DVD), a Secure Digital™ (SD) card, a MultiMediaCard (MMC) card, a CompactFlash™ (CF) card, or a combination thereof or other memories. Said differently, memory 730 can represent multiple processor-readable media. In some implementations, memory 730 can be integrated with processor 710, separate from processor 710, or external to computing system 700.

Memory 730 includes instructions or codes that when executed at processor 710 implement operating system 731, identification module 735, priority module 736, and reporting module 737. Identification module 735, priority module 736, and reporting module 737 can collectively be referred to as a security alert prioritization system. As discussed above, a security alert prioritization system can include additional or fewer modules (or components) than illustrated in FIG. 7.

As illustrated in FIG. 7, memory 730 is operable to store host-domain access map 739. For example, during runtime or execution of the security alert prioritization system including identification module 735, priority module 736, and reporting module 737, host-domain access map 739 (or a representation thereof) can be received via communications interface 720 from an inference module. As another example, the security alert prioritization system including identification module 735, priority module 736, and reporting module 737 can also include an inference module (not shown) to generate host-domain access map 739 based on network activity records.

In some implementations, computing system 700 can be a virtualized computing system. For example, computing system 700 can be hosted as a virtual machine at a computing server. Moreover, in some implementations, computing system 700 can be a computing appliance or virtualized computing appliance, and operating system 731 is a minimal or just-enough operating system to support (e.g., provide services such as a communications protocol stack and access to components of computing system 700 such as communications interface 720) identification module 735, priority module 736, and reporting module 737. As a specific example, computing system 700 can be an intrusion detection system appliance.

The security alert prioritization system including identification module 735, priority module 736, and reporting module 737 can be accessed or installed at computing system 700 from a variety of memories or processor-readable media. For example, computing system 700 can access a security alert prioritization system at a remote processor-readable medium via communications interface 720. As a specific example, computing system 710 can be a network-boot device that accesses operating system 731, identification module 735, priority module 736, and reporting module 737 during a boot process (or sequence).

As another example, computing system 700 can include (not illustrated in FIG. 7) a processor-readable medium access device (e.g., CD, DVD, SD, MMC, or a CF drive or reader), and can access identification module 735, priority module 736, and reporting module 737 at a processor-readable medium via that processor-readable medium access device. As a more specific example, the processor-readable medium access device can be a DVD drive at which a DVD including an installation package for one or more of identification module 735, priority module 736, and reporting module 737 is accessible. The installation package can be executed or interpreted at processor 700 to install one or more of identification module 735, priority module 736, and reporting module 737 at computing system 700 (e.g., at memory 730). Computing system 700 can then host or execute one or more of identification module 735, priority module 736, and reporting module 737.

In some implementations, identification module 735, priority module 736, and reporting module 737 can be accessed at or installed from multiple sources, locations, or resources. For example, some of identification module 735, priority module 736, and reporting module 737 can be installed via a communications link (e.g., from a file server accessible via a communication link), and others of identification module 735, priority module 736, and reporting module 737 can be installed from a DVD.

In other implementations, identification module 735, priority module 736, and reporting module 737 can be distributed across multiple computing systems. That is, some of identification module 735, priority module 736, and reporting module 737 can be hosted at one computing system and others of identification module 735, priority module 736, and reporting module 737 can be hosted at another computing system. As a specific example, identification module 735, priority module 736, and reporting module 737 can be hosted within a cluster of computing systems where each of identification module 735, priority module 736, and reporting module 737 is hosted at multiple computing systems, and no single computing system hosts each of identification module 735, priority module 736, and reporting module 737.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As another example, functionalities discussed above in relation to specific modules or elements can be included at different modules, engines, or elements in other implementations. Furthermore, it should be understood that the systems, apparatus, and methods described herein can include various combinations and/or sub-combinations of the components and/or features of the different implementations described. Thus, features described with reference to one or more implementations can be combined with other implementations described herein.

As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software includes hardware only (i.e., a hardware element with no software elements), software hosted at hardware (e.g., software that is stored at a memory and executed or interpreted at a processor), or hardware and software hosted at hardware.

Additionally, as used herein, the singular forms "a," "an," and "the" include plural referents unless the context clearly dictates otherwise. Thus, for example, the term "module" is intended to mean one or more modules or a combination of modules. Moreover, the term "provide" as used herein includes push mechanism (e.g., sending data to a computing system or agent via a communications path or channel), pull mechanisms (e.g., delivering data to a computing system or agent in response to a request from the computing system or agent), and store mechanisms (e.g., storing data at a data store or service at which a computing system or agent can access the data). Furthermore, as used herein, the term "based on" means "based at least in part on." Thus, a feature that is described as based on some cause, can be based only on the cause, or based on that cause and on one or more other causes.

What is claimed is:

1. A non-transitory processor-readable medium storing code representing instructions that when executed by a processor cause the processor to:
   identify a host associated with a security alert and a domain associated with the security alert, wherein the security alert is generated in response to a communication between the host and the domain;
   access a first security state associated with the host and a second security state associated with the domain; and
   compute a priority of the security alert based on a host-domain access map having a plurality of nodes, the plurality of nodes including a first node associated with the host and a second node associated with the domain, the host-domain access ma having an edge between the first node and the second node, the first node assigned the first security state based on a confidence measure associated with the security alert.

2. The processor-readable medium of claim 1, further comprising instructions that when executed by the processor cause the processor to:
   provide the security alert and the priority to a security monitor.

3. The processor-readable medium of claim 1, wherein the first security state associated with the host and the second security state associated with the domain are defined by belief propagation.

4. The processor-readable medium of claim 1, further comprising instructions that when executed by the processor cause the processor to:
   generate the host-domain access map; and
   define a security state for each node from the plurality of nodes using belief propagation, wherein the security state for the first node associated with the host comprises the first security state and the security state for the second node associated with the domain comprises the second security state.

5. The processor-readable medium of claim 1, further comprising instructions that when executed by the processor cause the processor to:
generate the host-domain access map based at least in part on the security alert;
assign an initial security state to each node in a subset of the plurality of nodes based on a plurality of confidence measures related to a plurality of security alerts; and
apply an iteration of belief propagation to the initial security state for each node of the plurality of nodes, wherein the security state for the first node associated with the host comprises the first security state and the security state for the second node associated with the domain comprises the second security state.

6. The processor-readable medium of claim 1, wherein the second security state associated with the domain comprises a default security state in response to a determination that the domain is unknown.

7. The processor-readable medium of claim 1, wherein:
the first security state associated with the host comprises a multiclass classification vector; and
the second security state associated with the domain comprises a multiclass classification vector.

8. The processor-readable medium of claim 1, wherein:
the priority of the security alert comprises a first priority in response to a first determination that the first security state associated with the host indicates a severe security risk and the second security state associated with the domain indicates a severe security risk; and
the priority of the security alert comprises a second priority different from the first priority in response to a second determination that the first security state associated with the host indicates a low security risk and the second security state associated with the domain indicates a low security risk.

9. The processor-readable medium of claim 1, wherein:
the priority of the security alert comprises a first priority in response to a first determination that the first security state associated with the host indicates a severe security risk and the second security state associated with the domain indicates a severe security risk; and
the priority of the security alert comprises a second priority different from the first priority in response to a second determination that the first security state associated with the host indicates a first security risk different from a second security risk indicated by the second security state associated with the domain.

10. A security alert prioritization system, comprising:
a graph generator that generates a host-domain access map based on network activity records;
an inference module that:
seeds the host-domain map based on a first confidence measure associated with a security alert; and
applies belief propagation to the host-domain access map to assign a security state to each node within the host-domain access map;
an identification module that identifies a host associated with the security alert and a domain associated with the security alert; and
a priority module that assigns a priority to the security alert using a first security state assigned to a first node within the host-domain access map associated with the host and a second security state assigned to a second node within the host-domain access map associated with the domain.

11. The security alert prioritization system of claim 10, further comprising:
a reporting module that reports the security alert and the priority assigned to the security alert to a security monitor.

12. The security alert prioritization system of claim 10, wherein:
a first network activity record of the network activity records includes the security alert, the security alert being one of a plurality of security alerts generated at an intrusion detection system; and
the inference module seeds the host-domain access map based on confidence measures associated with the plurality of security alerts, the first confidence measure being one of the confidence measures.

13. The security alert prioritization system of claim 10, wherein:
the inference module adds a new node to the host-domain access map and assigns a default security state to the new node in response to a determination that the domain associated with the security alert is not included in the host-domain access map, the new node being associated with the domain.

14. The security alert prioritization system of claim 10, wherein the security state assigned to each node within the host-domain access map comprises a multiclass classification vector.

15. A computing system, comprising a processor-readable medium storing code representing instructions that when executed by a processor cause the processor to implement a security alert prioritization system including:
an identification module that identifies a host associated with a first security alert of a plurality of security alerts and a domain associated with the first security alert, the first security alert generated in response to network traffic between the host and the domain;
a priority module that:
determines a joint probability of a first class and a second class, the first class represented in a first security state assigned to a first node within a host-domain access map associated with the host and the second class represented in a second security state assigned to a second node within the host-domain access map associated with the domain; and
assigns a priority to the first security alert using the joint probability of the first security state assigned to the first node and a second security state assigned to the second node; and
a reporting module that reports the first security alert and the priority assigned to the first security alert to a security monitor.

16. The computing system of claim 15, wherein the first security state assigned to the first node within the host-domain access map associated with the host and the second security state assigned to the second node within the host-domain access map associated with the domain are defined by belief propagation applied to the host-domain access map.

17. The computing system of claim 15, further comprising:
an inference module that seeds the host-domain access map based on a confidence measure of each security alert from the plurality of security alerts and applies belief propagation to the host-domain access map to assign the first security state to the first node within the host-domain access map associated with the host and assign the second security state to the second node within the host-domain access map associated with the domain.

18. The computing system of claim 15, wherein:

the priority module assigns a first priority to the first security alert in response to a first determination that the first security state associated with the host indicates a severe security risk and the second security state associated with the domain indicates a severe security risk; and the priority module assigns a second priority different from the first priority to the first security alert in response to a second determination that the first security state associated with the host indicates a low security risk and the second security state associated with the domain indicates a low security risk.

19. The computing system of claim 15, wherein:

the first security state assigned to the first node within the host-domain access map associated with the host comprises a first multiclass classification vector;

the second security state assigned to the second node within the host-domain access map associated with the domain comprises a second multiclass classification vector; and the priority module determines a joint probability of each class represented in the first security state assigned to the first node within the host-domain access map associated with the host and in the second security state assigned to the second node within the host-domain access map associated with the domain to assign the priority to the first security alert.

20. The computing system of claim 15, wherein the first security alert comprises an indication that the network traffic has been determined to be potentially malicious based on analysis of communication between the host and the domain and the priority comprises a classification of security issue significance based on a security risk.

* * * * *

UNITED STATES PATENT AND TRADEMARK OFFICE
CERTIFICATE OF CORRECTION

PATENT NO. : 9,124,621 B2  Page 1 of 1
APPLICATION NO. : 13/629222
DATED : September 1, 2015
INVENTOR(S) : Pratyusa Kumar Manadhata et al.

It is certified that error appears in the above-identified patent and that said Letters Patent is hereby corrected as shown below:

In the Claims

In column 16, line 48 approx., in Claim 1, delete "ma" and insert -- map --, therefor.

Signed and Sealed this
Fifth Day of July, 2016

Michelle K. Lee
*Director of the United States Patent and Trademark Office*